No. 705,922. Patented July 29, 1902.
A. GRAN.
WIND MOTOR.
(Application filed Nov. 13, 1901.)
(No Model.)
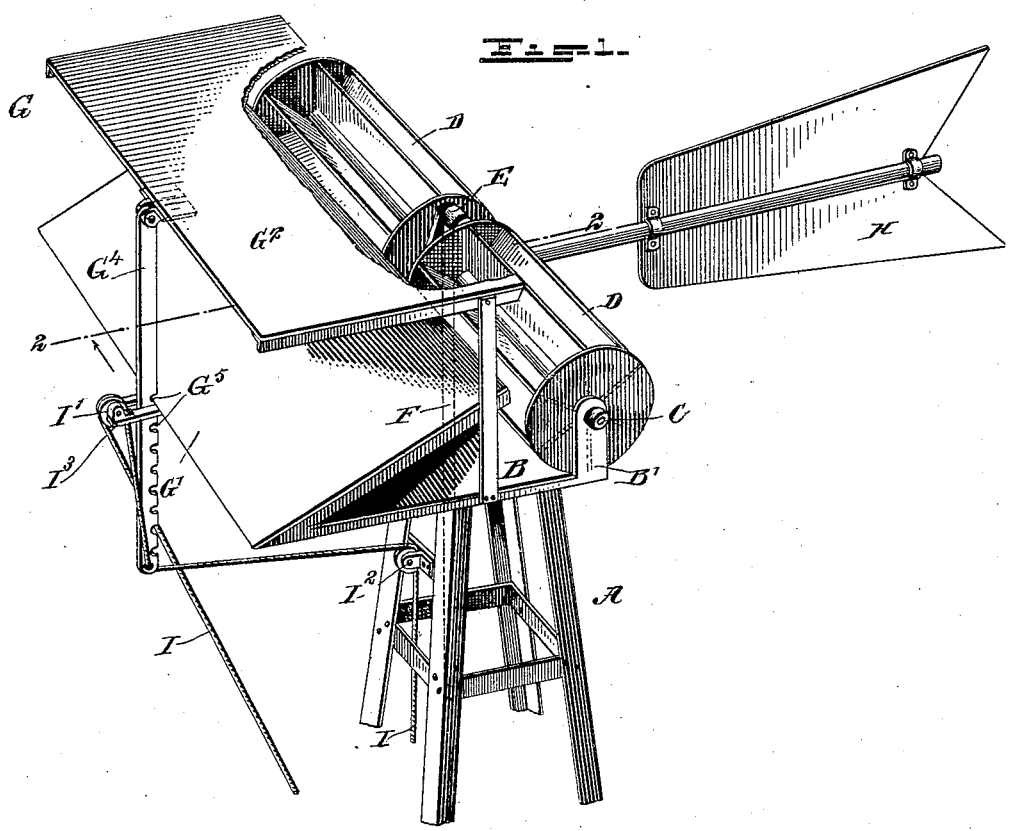
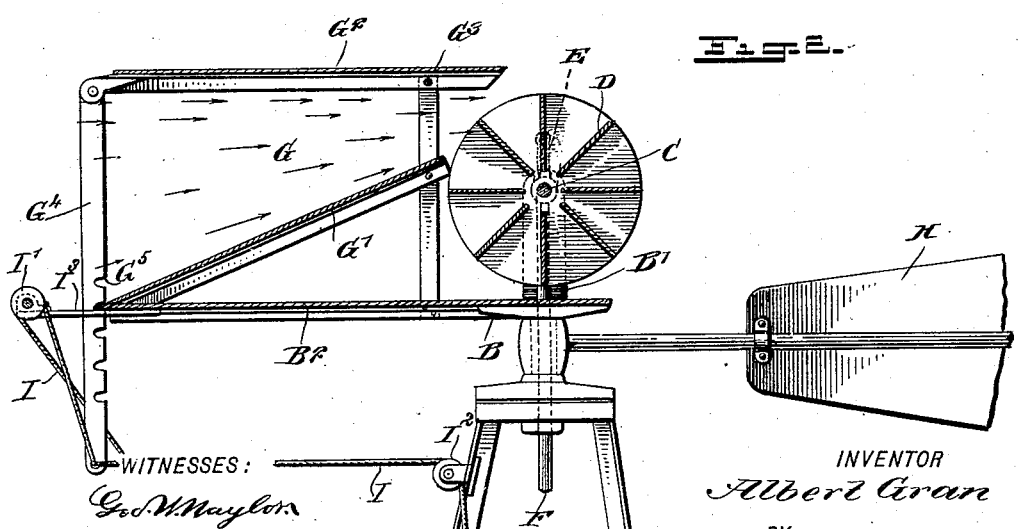

UNITED STATES PATENT OFFICE.

ALBERT GRAN, OF CHICAGO, ILLINOIS.

WIND-MOTOR.

SPECIFICATION forming part of Letters Patent No. 705,922, dated July 29, 1902.

Application filed November 13, 1901. Serial No. 82,113. (No model.)

*To all whom it may concern:*

Be it known that I, ALBERT GRAN, a citizen of the United States, and a resident of Chicago, in the county of Cook and State of Illinois, have invented a new and Improved Wind-Motor, of which the following is a full, clear, and exact description.

The object of the invention is to provide a new and improved wind-motor which is simple and durable in construction and arranged to utilize the force of the wind to the fullest advantage.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both views.

Figure 1 is a perspective view of the improvement, parts being broken out; and Fig. 2 is a longitudinal sectional elevation of the same, the section being on the line 2 2 of Fig. 1.

On the upper end of a suitably-constructed tower or other support A is mounted to turn a frame B, provided with bearings B' for a horizontally-disposed shaft C of a wind-wheel D, formed with buckets, as plainly illustrated in the drawings. On the shaft C is arranged a crank-arm E, connected in the usual manner with a pump-rod F, so that when the wind-wheel D rotates its power is transmitted to the pump or other machinery to be actuated. The force of the wind is directed to the buckets of the wind-wheel D by a chute G, secured to or forming part of the frame B, the said chute comprising an inclined bottom G', extending upwardly and inwardly from the outer end of the bottom $B^2$ of the frame B, so as to reach with its upper inner end close to the peripheral surface of the wind-wheel D, near the upper end thereof, as plainly indicated in Fig. 2. A top or roof $G^2$ extends over the inclined bottom G' and is pivotally connected at $G^3$ to the frame B, and its outer end is held on a supporting-bar $G^4$, formed with notches $G^5$, adapted to engage the bottom $B^2$, and the said bar $G^4$ is controlled by a rope I, passing over pulleys I' and $I^2$, so that the operator can adjust the top or roof $G^2$ to increase or decrease the opening leading to the chute G. The pulley I' is journaled on a bracket $I^3$, carried by the bottom $B^2$, and the other pulley is journaled on the tower A. The rope I passes loosely through an opening in the lower end of the bar $G^4$. The inner end of the top $G^2$ extends close to the top of the wind-wheel D, as plainly indicated in Fig. 2, so that the wind entering the chute G is caused to travel up the inclined bottom G', which directs the wind into the buckets of the wind-wheel, so as to turn the latter.

It is understood that the chute G is held into the wind by a suitable vane H, carried by the frame B, to cause the chute to extend at all times in the direction of the wind, so that the latter properly enters the buckets of the wind-wheel D, and consequently exerts its full force on the wind-wheel to turn the same and actuate the machinery connected therewith. It is understood that by the arrangement described the inner end of the chute G is somewhat contracted to cause compression of the wind and immediate expansion thereof as soon as it reaches the buckets of the wind-wheel D.

The wind-motor may be constructed of any desired size, and one or more wind-wheels may be used on the same shaft, as indicated in Fig. 1.

Having thus described my invention, I claim as new and desire to secure by Letters Patent—

1. A wind-motor, consisting of a frame mounted to turn, a wheel journaled in the frame, a chute for directing the wind to the wheel and comprising an inclined bottom extending upwardly and inwardly from the frame to within a short distance of the periphery of the wheel, and a top hinged to the frame and extending partially over the wheel, a bar pivoted to the top of the chute and provided with notches engaging the frame, a bracket secured to the frame and provided with a slot through which the bar passes, a pulley mounted in the bracket, and a rope passing loosely through an opening in the said bar and over said pulley, as set forth.

2. A wind-motor, comprising a frame mounted to turn, a wheel journaled in the frame, a chute for directing the wind to the wheel and comprising an inclined bottom extending upwardly and inwardly from the outer edge of the frame to within a short distance of the periphery of the wheel, and a hinged top extending partially over the wheel, a bar hinged to the top and having notches engaging the frame, and a rope operatively connected with the said bar, as set forth.

3. In a wind-motor, the combination with a support, and a wheel mounted therein, of a chute, comprising an imperforate inclined bottom extending to within a short distance of the periphery of the wheel at about the center thereof and a hinged top extending partially over the wheel, a bar hinged to the top and having an interlocking engagement with the said bottom, and means connected with the said bar for operating it, as set forth.

In testimony whereof I have signed my name to this specification in the presence of two subscribing witnesses.

ALBERT GRAN.

Witnesses:
PETRUS ANDERSON,
AUGUST BAUM.